(12) United States Patent
Pedlow, Jr.

(10) Patent No.: US 7,929,696 B2
(45) Date of Patent: Apr. 19, 2011

(54) RECEIVING DBS CONTENT ON DIGITAL TV RECEIVERS

(75) Inventor: Leo M. Pedlow, Jr., Ramona, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1353 days.

(21) Appl. No.: 11/446,672

(22) Filed: Jun. 5, 2006

(65) Prior Publication Data

US 2006/0274208 A1     Dec. 7, 2006

Related U.S. Application Data

(60) Provisional application No. 60/688,513, filed on Jun. 7, 2005.

(51) Int. Cl.
*H04N 7/167* (2011.01)

(52) U.S. Cl. ............. 380/212; 725/93; 725/94; 725/95; 725/96; 725/97; 709/231; 726/13

(58) Field of Classification Search .......... 713/1, 2, 713/188, 194; 380/200, 201, 255, 277, 212, 380/210; 726/2, 13; 725/93–97, 116; 709/231
See application file for complete search history.

(56) References Cited

U.S. PATENT DOCUMENTS

| | | | | |
|---|---|---|---|---|
| 4,367,557 A | * | 1/1983 | Stern et al. ............. | 725/149 |
| 4,439,784 A | * | 3/1984 | Furukawa et al. ......... | 725/25 |
| 4,550,341 A | * | 10/1985 | Naito .................. | 725/25 |
| 5,052,047 A | * | 9/1991 | Otto ................... | 455/1 |
| 5,455,862 A | | 10/1995 | Hoskinson | |
| 5,550,579 A | | 8/1996 | Martinez | |
| 5,826,166 A | * | 10/1998 | Brooks et al. ........... | 725/134 |
| 6,003,041 A | * | 12/1999 | Wugofski ............... | 707/104.1 |
| 6,115,080 A | * | 9/2000 | Reitmeier .............. | 348/731 |
| 6,215,530 B1 | * | 4/2001 | Wasilewski ............. | 348/731 |
| 6,459,703 B1 | * | 10/2002 | Grimwood et al. ........ | 370/442 |
| 6,985,591 B2 | | 1/2006 | Graunke | |
| 7,039,048 B1 | * | 5/2006 | Monta et al. ........... | 370/389 |
| 7,477,324 B2 | * | 1/2009 | Vlot .................. | 348/723 |
| 7,567,565 B2 | * | 7/2009 | La Joie ............... | 370/390 |
| 2001/0039180 A1 | | 11/2001 | Sibley et al. | |
| 2002/0038458 A1 | | 3/2002 | Staal et al. | |
| 2004/0060065 A1 | | 3/2004 | James et al. | |
| 2004/0268408 A1 | | 12/2004 | Lee et al. | |
| 2005/0114141 A1 | * | 5/2005 | Grody ................. | 704/270 |
| 2005/0177860 A1 | | 8/2005 | Goyal et al. | |

* cited by examiner

*Primary Examiner* — Joseph Thomas
*Assistant Examiner* — Joseph Pan
(74) *Attorney, Agent, or Firm* — Miller Patent Services; Jerry A. Miller

(57) ABSTRACT

A digital television (DTV) signal converter consistent with certain embodiments has a satellite band receiver that receives satellite television broadcast data from a satellite service and demodulates the satellite television broadcast data into a digital data stream. The digital data stream contains television content, satellite television logical channel identification information and electronic program guide data, and wherein television content, the logical channel identification information and the electronic program guide data are associated with a set of logical channels provided on the satellite service. A data mapper maps the satellite television logical channel identification information in the data stream to DTV channel identification information. A quadrature amplitude modulation (QAM) modulator modulates the DTV channel identification information, the television content and the program guide data for transmission as an output comprising one or more QAM transport streams to a digital television. The data mapper further determines whether or not the satellite television logical channel will fit within one QAM transport stream, and assigns the satellite television logical channel to one or more QAM transport streams for transmission. This abstract is not to be considered limiting, since other embodiments may deviate from the features described in this abstract.

38 Claims, 7 Drawing Sheets

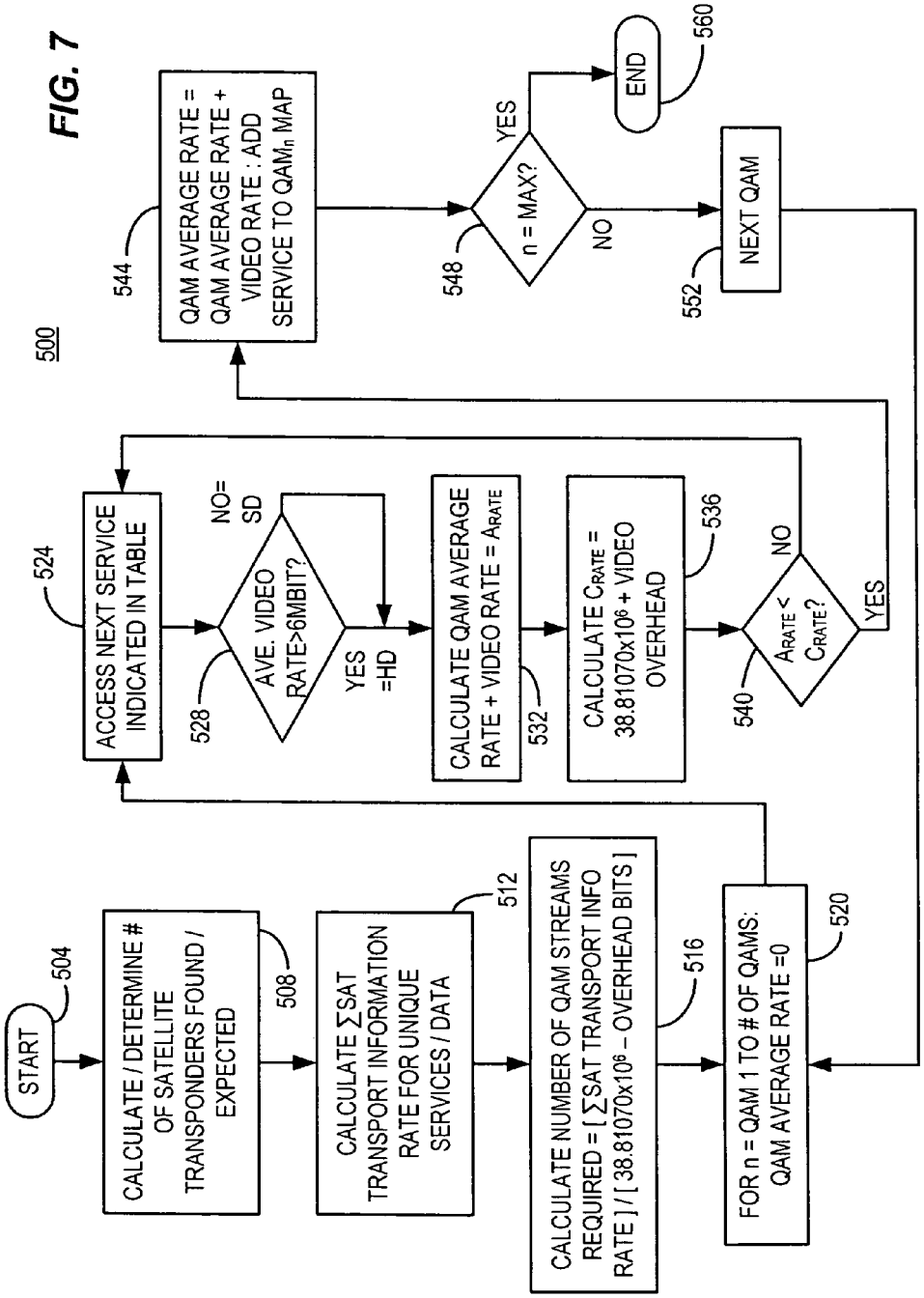

RECEIVING DBS CONTENT ON DIGITAL TV RECEIVERS

CROSS REFERENCE TO RELATED DOCUMENTS

This application is related to and claims priority benefit of U.S. Provisional Patent Application No. 60/688,513, filed Jun. 7, 2005 which is hereby incorporated by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Presently, the most common way to obtain Digital Broadcast Satellite (DBS) reception is through the use of a large, bulky, proprietary external satellite receiver box co-located with each TV set. In such circumstances, each box replicates most of the electronics used for decoding the content. There is currently no mechanism available to enable a standard digital TV to decode the satellite signal directly. The formats and protocols used for signaling, content carriage, management, control, etc. are unique and in many cases proprietary to a particular satellite service provider, precluding a single box enabling navigation of available services.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 7 is a flow chart of an exemplary multi-tuner mapping process consistent with certain embodiments of the present invention.

DETAILED DESCRIPTION

Figure 1:
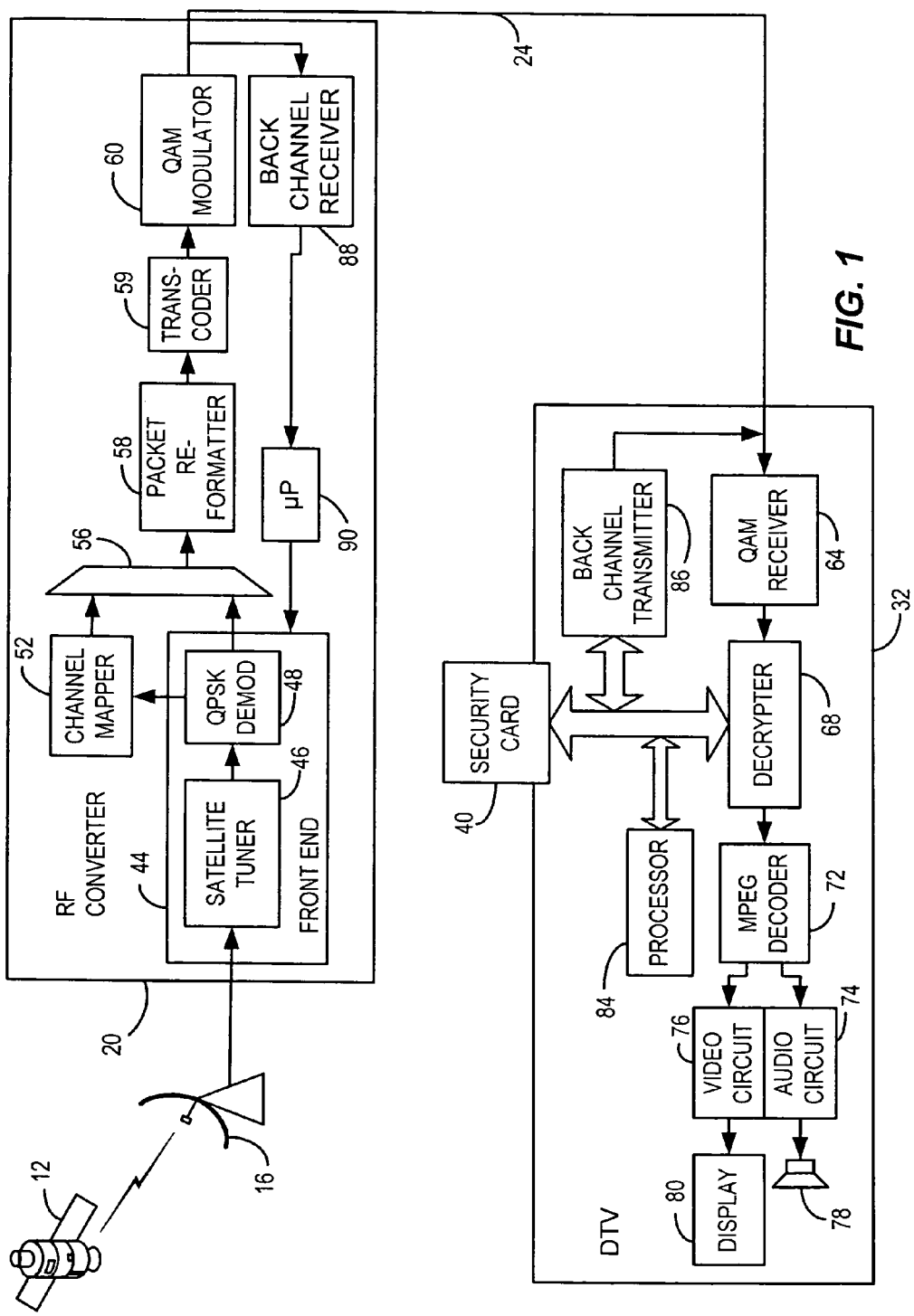
FIG. 1 is a first exemplary DBS distribution arrangement consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content which would be interpreted as and reported in an electronic program guide (EPG) as a single television program, without regard for whether the content is a movie, sporting event, segment of a multi-part series, news broadcast, etc.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In certain embodiments, the present invention relates to a mechanism to securely receive direct broadcast satellite services (DBS) using existing digital television receivers. In accordance with certain embodiments, a single one or multiple TV sets in a home, condo or apartment complex can be connected through common coaxial cable in the standard fashion similar to that which would be used for distribution of cable television signals. The television signal can thus be distributed without expensive switching gear or amplifiers, as is required for DBS today. Each attached TV is individually addressable and assignable to separate or common billing accounts and can have individual service plans, entitlements, locks, limitations, etc. Several variations are possible within the scope of the present invention, and for illustrative purposes, two such embodiments will be depicted and described herein with the understanding that numerous variations are possible.

With reference to FIG. 1, in accordance with this exemplary embodiment, the process uses a device 20 in conjunction with a security card similar to a CableCARD™ or Point of Deployment (POD) module 40, typically specific to a particular satellite service provider, in a digital television receiver or other CableCARD™ enabled digital cable television navigation device to provide navigation and security functions for DBS content. The CableCARD™ may employ DCAS or other form of downloadable security so that a single card may be applicable to multiple service providers through software reconfiguration. Similarly, the entire card function may be embodied as a software defined security device (e.g., an integrated circuit) permanently installed directly in the DTV as a substitute for the CableCARD™. The content is received as a satellite transmission from one or more satellites 12 using a standard DBS dish antenna 16 and incorporated low noise block converter (LNB), used to receive and convert all satellite radio frequency signals from a specific service provider as a block or group of discrete frequencies in a band, Ku (10.7-12.75 GHz), Ka (19-22 GHz) or X (8-12 GHz) bands, for example, to an intermediate frequency appropriate for distribution in the home over coaxial cable, typically L-band (950-2150 MHz). The received signal is coupled to an RF converter 20, which may be co-located within the dish antenna's existing electronics or at some other convenient location. Signals from the RF converter 20 are then fed by cable 24 directly, or via one or more splitter(s) and/or distribution amplifier(s) to one or more digital television receiving devices such as a digital TV set 32. In certain embodiments, the signal may be distributed using a suitable signal distribution system in a multiple user dwelling such as a condominium or apartment complex to multiple digital television receivers, as will be seen later, such as receivers 32, 34 and 36.

The RF converter 20, centrally located or contained within the existing DBS receiving dish electronics, converts the block of intermediate frequency satellite signals, such as L-Band (950-2150 MHz), having a m-ary quadrature modulation format such as Quadrature Phase Shift Keying (QPSK) modulation, to a block of TV band signals (e.g., 54-863 MHz), each with 256 symbol QAM modulation (256 QAM). Current US digital TVs have the ability to receive and detect 256 QAM modulated television signals directly. Alternatively, 8 and/or 16-VSB modulation, consistent with U.S. digital television broadcast, may be used in lieu of 256 QAM. The mapping of transponders to remodulated transport multiplexes should be appropriately scaled based upon the information data rates of the particular modulation scheme employed. For purposes of this document, 256 QAM, having an information rate of 38.188070 MBPS is used by way of example, but should not be considered limiting. In accordance with the present embodiment, remapping of certain services to different transports are carried out at the RF converter 20, in order to fit the services from a particular received transport that may have a higher information rate and therefore greater capacity, to a plurality of newly created TV band transports, each having a lower information rate than the satellite transport and therefore reduce capacity. As a result, the mapping of content and transports received from the satellite service may not necessarily be one-for-one. The signal converter may be implemented using one or more LSI integrated circuits in accordance with certain embodiments, or may be fabricated using more discrete elements or modules in other embodiment.

RF converter 20 operates to convert the received satellite signal to a Quadrature Amplitude Modulation (QAM) modulated signal that can be decoded directly by a digital television (DTV) receiver when properly equipped with an appropriate security card 40, as will be explained later. The RF converter 20 incorporates a satellite receiver front-end circuit 44, under control of microprocessor 90, that tunes satellite transmissions by selection of appropriate frequencies, etc. The output of the satellite tuner 46 passes the baseband signal received from the satellite dish 16 to a demodulator 48 that demodulates the transmitted satellite signal obtained from the front-end circuit 44 into one or more transport streams carrying, for example, Moving Pictures Expert Group (MPEG) encoded content. Since DBS satellite services are typically made up of a block of frequencies, the front-end 44 may be realized as a composite of discrete tuners 46 and demodulators 48, each tuned to a different frequency and producing an independent digital transport stream. In many or most instances, such content is encrypted according to a prescribed encryption algorithm. These transport streams are filtered to separate (demultiplex) and send certain information including, but not limited to, logical channel number, satellite number, transponder number, MPEG service number, Electronic Program Guide (EPG) data and entitlement data to a channel mapper circuit 52.

Integration of satellite receiver front-end circuitry 44 is currently available in highly integrated form making realization of the RF converter 20 a convenient task. Further integration to the point of production of an entire front end on a single integrated circuit chip is also contemplated.

Channel mapper circuit 52 operates to map the unique information that identifies each channel (e.g., the satellite numbers, transponder numbers, logical channels and MPEG service numbers) in the satellite system to a unique set of information (e.g., logical channel and SCTE 65 compliant data) that can be interpreted by a digital television set, with the assistance of Security Card 40. The channel mapper circuit 52 further operates to map and/or repackage other information such as entitlement data, if necessary, into the appropriate DTV compliant format. This re-mapped information is then multiplexed at a multiplexer 56 with packets containing the demodulated digital television content. In addition, because the information rates for the demodulated satellite transport streams obtained from the front-end 44 may not match the standard information rate for 256-QAM modulation, the multiplexer 56, using the results of the channel mapper 52 and as described above, will as necessary redistribute services amongst the transport multiplexes and as necessary and per the tables created in the channel mapper 52, create entirely new transport streams in order to accommodate any or all services after translation to QAM data rates.

Channel Mapper 52 operates to determine the makeup of one or more QAM transport streams that will be used to carry the particular logical channel. An exemplary process for carrying out this mapping will be described later in connection with FIG. 7, but generally, the process determines if the logical channel is standard or high definition, and then maps the data to available bandwidth in one or more QAM transport streams to the ultimate destination. When the QAM transport streams arrive at the destination, security card 40 uses mapping information generated by the channel mapper to identify the location of the content for each logical channel so the particular logical channel can be displayed.

In many instances, the packet size and format of data from front-end 44 will not be in the same format specified for a digital TV receiver. Hence, the packets may be re-formatted at packet re-formatter 58 and transcoded at 59 if required into standard MPEG compliant data packets. These re-formatted packets are passed to a (QAM) modulator and RF upconverter 60 to produce a radio frequency output which is a DTV compliant television signal which can be received and decoded using a conventional digital television set or other DTV compliant receiver. Since the output of packet re-formatter 58 may in actuality comprise multiple transport streams, the QAM modulator and RF upconverter 60 may actually be realized as a composite of discrete modulators and upconverters, each processing a particular digital transport stream and creating a unique QAM modulated signal on a specific RF frequency. Such DTV signals can then be distributed via coaxial cable as deemed appropriate to reach receiver 32.

The DTV receiver device 32 receives the DTV signal and demodulates the signal using a QAM receiver 64 in a conventional manner to produce an output transport stream that can be decrypted at decrypter 68 using conditional access information obtained from security card 40. (Alternatively, security card 40 can carry out the decryption process without need for an external decrypter.

Each digital television receiver is equipped with a security card 40 (i.e., a "Sat-Card") which is used instead of a conventional CableCARD™ type module. The Sat-card emulates the terminal interface functionality of a CableCARD™ device, but internally uses data recovered from in-band signaling or other suitable means to retrieve data to build table structures for use by processor 70 of the host receiver device 32 in constructing tuning tables, and EPG as well as providing entitlements, locks, limits, and other functions that are normally carried out using information from the CableCARD™ device that was obtained, for example, through out-of-band (OOB) communication on a digital cable television network. Additionally, the encoding format originally used to compress the actual content at the satellite uplink prior to transmission in one embodiment may be transcoded at the Sat-card or in an alternate embodiment in the RF converter 20 from different, a newer or more efficient format such as MPEG-4 or AVC to the MPEG-2 format compatible with all digital television receivers, per FCC mandate.

As noted, the Sat-card replaces and emulates the functions of a CableCARD™ module used in digital TVs for secure cable content reception and uses a standards-based interface slot on newer digital televisions. Different Sat-cards can be used for each provider of commercial satellite service (e.g., Dish Network™ and DirecTV™) to conform to the provider's proprietary technology. Each Sat-card contains the logic, software and circuitry necessary to interpret the DBS provider's proprietary navigation data carried in-band and convert it to the standardized format compatible with the CableCARD™ module interface as specified in the relevant CableLabs specifications. Also included in the Sat-Card is the conditional access circuitry, smart cards, logic, software, encryption technology, etc. appropriate to a particular DBS service provider.

Per the existing CableCARD™ specifications, security of digital content passing between the card, in this case the Sat-Card, and the MPEG decoder is maintained by re-encryption of the content using a service provider independent cipher and management scheme. For the described CableCARD™ interface, a preferred method is DFAST, though other methods may be employed in other implementations. The MPEG packets re-encrypted by the Sat-Card are decrypted within the MPEG decoder 72 by decrypter 68. The rest of the processing is handled in a more or less conventional manner using an MPEG decoder 72 that decodes the appropriate packets in the transport stream into audio and video, which is provided to audio circuit 74 and video circuit 76 respectively for playback over an audio speaker system 78 and video display 80 respectively. EPG data that is generated by interpretation of the appropriate tables can be sent by the processor 70 as data to be rendered by a graphics engine 82 for display on the display 80. Processor 84 provides for control functions of the DTV receiver.

In satellite television systems, each transponder may be used to carry multiple logical channels of content (e.g., perhaps as many as 10 to 20 channels of content). Accordingly, there is not necessarily a one-to-one mapping from transponder to logical channel for a given satellite. Thus, the MPEG service identifiers are also used to map a particular logical channel. A satellite television provider may provide dozens or even hundreds of channels to a particular user, but front end 44 is generally only able to tune to a single transponder at a time. In certain embodiments, a back channel function may be used, such as the "back channel" function present in DTV receivers that are made compliant to the specifications currently being considered (as of this writing) by the FCC as part of the interactive digital cable receiver discussions. Since the DTV user may be entitled to and wish to tune to logical channels appearing on multiple transponders. In the illustrated embodiment, this can be accomplished by use of a so called "back channel" or "upstream channel" that allows the user to change the tuning of front end circuit 44 to a new transponder in order to effect a channel selection.

In this embodiment, a back channel is depicted as using the same cable 24 that carries content, but this should not be considered limiting since wireless techniques as well as other wired techniques could be used. When a user selects a channel corresponding to a different transponder than that already being tuned to, the desired tuning is transmitted via a back channel transmitter 86 to back channel receiver 88. The command is delivered to a control processor 90 that instructs the front end circuit 44 to tune to the transponder corresponding to the channel selected. The mapping of logical channels to the appropriate transponder can be stored in a memory in converter 20 when it is obtained from the data stream being received in a conventional manner. Once the front end 44 tunes to the correct transponder (and satellite if required), the DTV receiver device 32 can begin receiving the selected logical channel by selection of the appropriate MPEG data in the transport stream being received.

Figure 2:
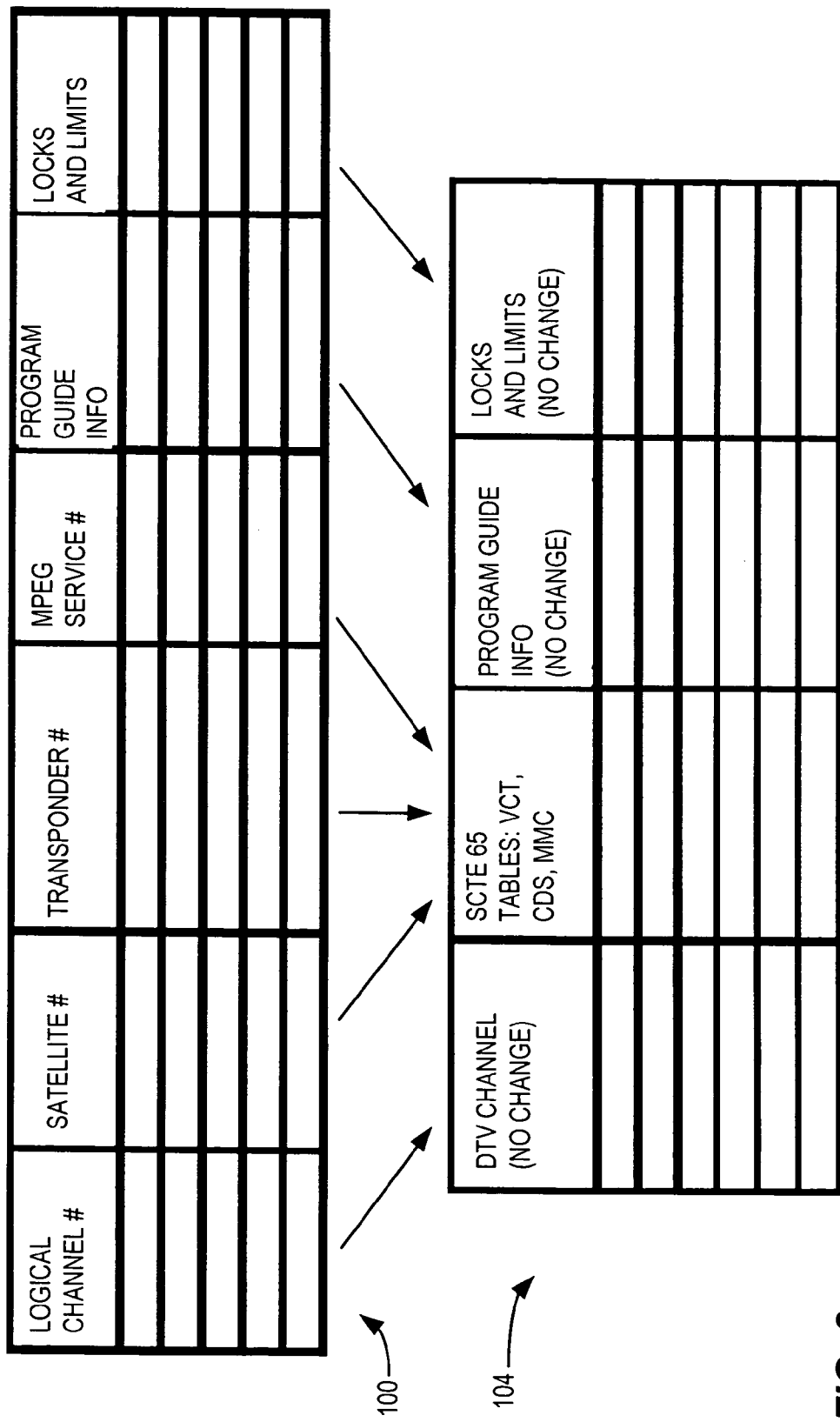
FIG. 2 illustrates an exemplary mapping from DBS to DTV consistent with certain embodiments of the present invention.

Turning now to FIG. 2, one illustrative mapping, depicted as tables, is shown for mapping certain DBS data to DTV data for use by a digital television receiver such as 32.

In accordance with certain illustrative embodiments consistent with the present invention, Service Information (SI) from the DBS transport stream is translated is into Society of Cable Telecommunications Engineers (SCTE) SCTE-65 (2002) compliant format. The specification for this data format is hereby incorporated by reference. At this writing, this is the standard recognized by the Federal Communications Commission (FCC) for conveying SI from a CableCARD™ type module to the TV host, but other standards could be applied for DTV receivers that are compatible with other standards. In certain embodiments consistent with the invention, the data illustrated in table 100 are translated into corresponding SCTE 65 data in table 104. As illustrated in this example, the satellite number, transponder number, and MPEG service ID (or equivalent data) associated with each logical service as carried in the DBS provider's proprietary tables are translated into equivalent values as used by SCTE 65 compliant data tables.

In this example, the logical channel number remains unchanged between the native and the translated services and is simply transferred from table 100 to table 104. Because it is unchanged in this embodiment, the mapping of logical channel to the Electronic Program Guide (EPG) can also be carried unchanged embedded within the outgoing stream from RF converter 20. In instances where there is a mismatch in the output capacity of a particular transponder with a particular QAM frequency band, additional mapping can be carried out at the channel mapper 52 so that content associated with certain logical channels are mapped to a different frequency band. In this case, selection by the user of a new logical channel may result not only changing to a new program stream in the service multiplex carried in 24, but also possibly changing to an entirely different transponder and therefore a different QAM modulated signal carrying a different multiplex of services. If the satellite packet format is proprietary (e.g., as in the DirecTV® satellite service), other embodiments consistent with the invention can, if signaled by the host or manually configured, reformat the contents by buffering the non-standard format and regenerating the packets into a standard MPEG format for delivery of SI data that is compatible with all host DTV receiver devices. Host DTV receiver devices that can accept the nonstandard packet formats used for certain satellite television broadcasts can receive such in their native form without regeneration of SI packets.

In the exemplary embodiment, the logical channels remain unchanged and thus the EPG information can similarly remain unchanged. However, those skilled in the art will understand upon consideration of the present teaching that those data could also be translated if desirable for a particular implementation, without departing from embodiments consistent with the present invention.

The entitlements (locks and limits) established for a particular subscriber can also be transferred directly from table 100 to table 104 without change. Such entitlements are used in conjunction with the DTV's conditional access scheme to determine which content a specific DTV receiver device is enabled to decode.

In the present embodiment, only a single circuit for carrying out the conversion in RF converter is depicted, however, in implementations discussed later, multiple conversions of the satellite signal to QAM may be done in order to provide for multiple streams of QAM data concurrently on adjacent RF channels in the VHF/UHF spectrum, so that no back channel is needed in some instances. Also, by use of multiple adjacent RF channels, the present embodiment can be utilized in connection with existing one-way digital TV receiver devices (i.e., having no back channel for communication to the RF converter device 20.

Conditional access can remain unaltered in accordance with one embodiment and the content can remain encrypted until after the content is received by the host digital television receiver device 32. In an alternative arrangement, the encryption used for the satellite downlink may be decrypted at the RF converter device 20 and then re-encrypted with another cipher and Conditional Access System (CAS) prior to QAM transmission to the digital television receiver device host. In any case, the host TV receiver uses the security card in much the same way as currently provided for in cable systems.

It will be evident upon consideration of this teaching that with a single front end circuit 44, is only able to provide a limited number of readily available channels without retuning. Thus, although multiple receivers could be connected to the same signal source to receive the television content, they might be restricted to a subset of the available logical channels. In accordance with certain embodiments, the RF converter 20 can be constructed in a manner to allow for modular expansion so that two or more front end modules can be added to permit two or more DTV receiver devices to tune independently of one another. In such an embodiment, multiple front end circuits and multiple QAM modulators can be provided for to permit multiple users to individually access content. These multiple instances of tuners and demodulators may be integrated into a single integrated circuit, or may be modular, for example.

Figure 3:
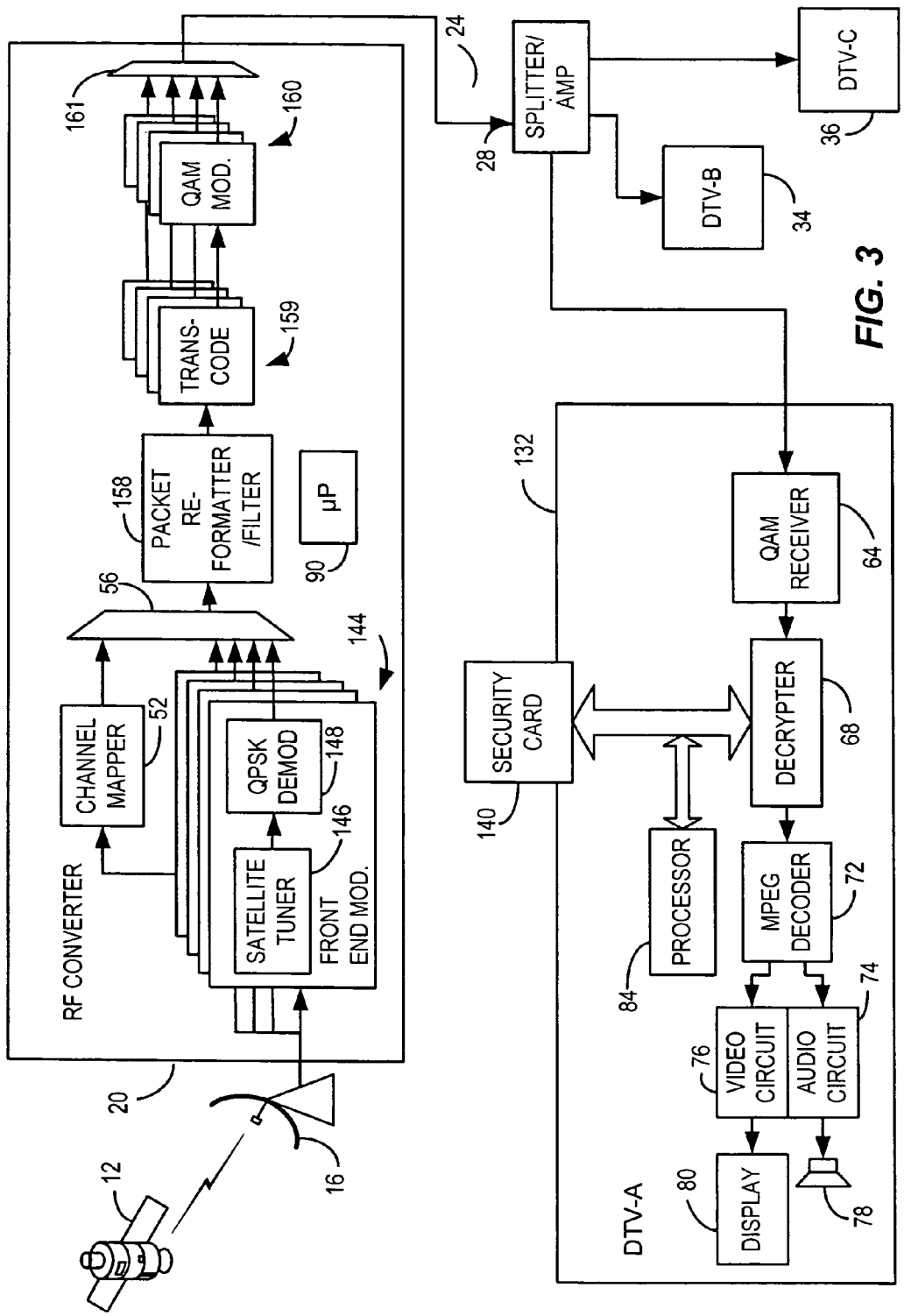
FIG. 3 is a second exemplary DBS distribution arrangement consistent with certain embodiments of the present invention.

Turning now to FIG. 3, another embodiment is depicted. In this embodiment, an array of front end modules 144, each having a tuner 146 and a QPSK demodulator 148 are provided. Since the data used by the channel mapper are provided in a redundant manner on all transponders, only a single channel mapper 52 receiving data from any of the front end modules 144 is needed. In a similar manner, an array of QAM modulators 160 can be provided to modulate the data for output from converter 20. The output of all of the QAM modulators 160 can be combined at signal combiner 161 and amplified as desired for output to cable 24. This output can then be distributed, e.g., using splitters and/or amplifiers 28, to service multiple digital television receivers such as 132, 34 and 36. For basic operation of this arrangement, no back channel is needed, and the DTV can simply tune any channel in a conventional fashion.

A packet reformatter and filter 158 operates in a similar manner to that of packet reformater 58, but may also carry out filtering functions under control of processor 90. A plurality of transcoders 159 similarly operate in the same manner as transcoder 58. That is, in many instances, the packet size and format of data from front-end 144 will not be in the same format specified for a digital TV receiver. Hence, the packets may be re-formatted at packet re-formatter 158 and transcoded at 159 if required into standard MPEG compliant data packets. These re-formatted packets are passed to a (QAM) modulators and RF upconverters 160 to produce a radio frequency output which is a DTV compliant television signal which can be received and decoded using a conventional digital television set or other DTV compliant receiver. The multiple instances of transcoders 159 or other multiple duplicate circuits shown herein may be either separate circuits, modules, or integrated circuits, or may be implemented on a single integrated or other circuit.

If enough front end modules and QAM modulators are provided to account for all digital transport streams and the multiple television services carried within each provided by a particular service provider over all available transponders, no back channel is needed to effect tuning to any desired channel. Thus, no back channel is needed and conventional one way DTV receivers can be used.

Using this approach eliminates the redundant decoder boxes (often one at each television receiver) currently in use. In certain embodiments, this may provide a lower cost than the existing method of distributing DBS services in accordance with certain embodiments.

It should be noted that if EPG is necessary (or desirable), but the host cannot render it (or the service operator forbids providing data), the security card module can construct the guide screens and place them as still images on a unallocated virtual channel. In accordance with certain embodiments, the user can navigate such a guide through, for example, a wireless connection or upstream path to the RF converter 20, depending upon the desired realization.

Based upon the specifics regarding the satellite content floorplan regarding number of services and data rates per transponder, there may or may not be a direct correlation between a particular transponder and a single or multiple QAM(s). The mapping arrangement shown above accommodates both cases.

Thus, a digital television (DTV) signal converter consistent with certain embodiments has a satellite band receiver that receives satellite television broadcast data from a satellite service and demodulates the satellite television broadcast data into a digital data stream. The digital data stream contains television content, satellite television logical channel identification information and electronic program guide data, and wherein television content, the logical channel identification information and the electronic program guide data are associated with a set of logical channels provided on the satellite service. A data mapper maps the satellite television logical channel identification information in the data stream to DTV channel identification information. A remodulator such as a quadrature amplitude modulation (QAM) modulator or VSB modulator modulates the DTV channel identification information, the television content and the program guide data for transmission as an output comprising one or more QAM transport streams to a digital television. The data mapper further determines whether or not the satellite television logical channel will fit within one QAM transport stream, and assigns the satellite television logical channel to one or more QAM transport streams for transmission.

In accord with certain embodiments, the satellite television logical channel identification information includes a satellite number, a transponder number and an MPEG service number for each logical channel provided by the satellite television service. The DTV channel identifying information may be SCTE 65 compliant tables. The data mapper may further map satellite entitlement data associated with the logical channels for a specified subscriber to DTV compatible entitlement data, where the DTV compatible entitlement data are also QAM modulated for receipt by the DTV. A security card identifies a specified satellite service subscriber and carries out conditional access functions for the satellite service at the DTV. The satellite band receiver may be modular. The signal converter may also be adapted to receive multiple satellite band receiver modules. The QAM modulator may also be modular and the signal converter may be adapted to receive multiple satellite band receiver modules.

In certain embodiments, a back channel receiver receives commands from a digital television receiver recipient of the QAM output of the signal converter in order to select at least one of a transponder and a satellite, and a QAM band in response to the commands. The satellite band receiver may have multiple satellite band receivers that tune to multiple transponders, wherein the quadrature amplitude modulator includes a transmitter for transmitting QAM output signals over a plurality of frequency bands. The QAM modulator may actually be made up of a plurality of QAM modulators.

In certain embodiments, the content as received from the satellite is encrypted using a conditional access encryption method, wherein the encrypted content is passed to the output without decryption. The content as received from the satellite may include an electronic program guide (EPG) data, and the EPG data may be passed to the output without modification. The mapper may map a satellite logical channel identifier directly to a DTV channel identifier without modification. The mapper may map entitlements directly from the satellite logical channel identifying information to the DTV channel identifying information without modification. The data mapper may determine that the satellite television logical channel will not fit within one QAM transport stream and assign the satellite television logical channel to a plurality of QAM transport streams for transmission. A single QAM transport stream may be used by the data mapper to carry fragments of a plurality of logical channels. A reformatter may be used to format data from the digital data stream. A transcoder may be used to transcode the output of the reformatter into MPEG compliant video data.

Figure 4:
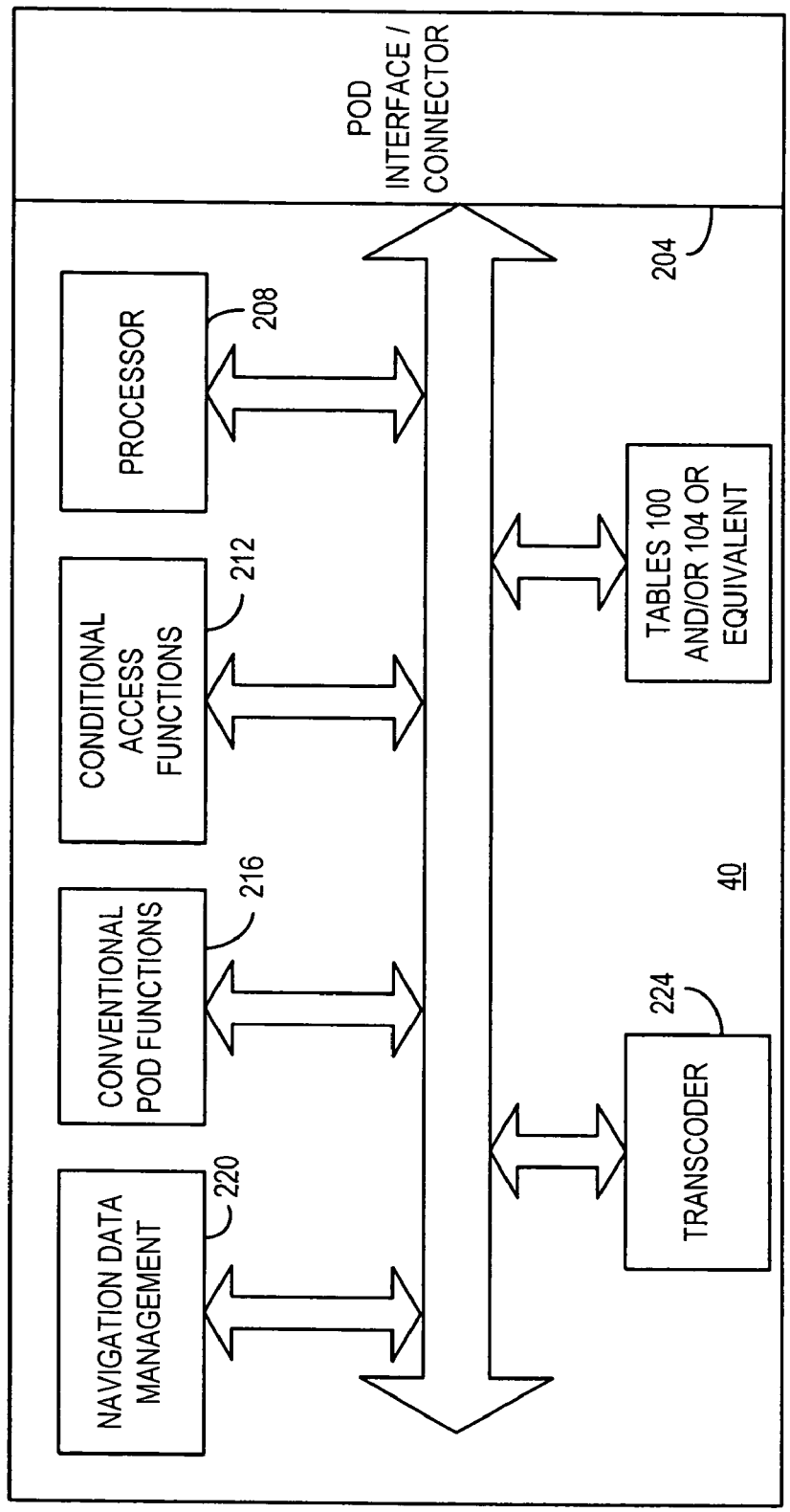
FIG. 4 illustrates functional blocks of an exemplary security card consistent with certain embodiments of the present invention.

Security card 40 or 140 can take many forms in accordance with the particular embodiment and satellite services provider at hand. However, FIG. 4 depicts the basic functional modules, which can be realized in hardware, firmware or software according to the embodiment at hand. Module 40 preferably incorporates a standard POD or CableCARD™ interface 204 and is further preferably of the same form factor as such devices so that they can operate in a standard digital television receiver. The security module 40 generally includes one or more programmable processor 208 used for carrying out oversight functions and other general purpose functions. Conditional access functions (specific to the satellite service provider) are carried out at 212, and other functions required by standard to be carried out by a POD device are carried out at 216. Downloadable security techniques may be similarly employed. Navigation data management functions are depicted as 220 for embodiments in which channel navigation functions are needed or desired. Transcoder functions may also be provided at 224. As previously noted, such functions may be implemented in any suitable manner including hardware, firmware and software embodiments, without limitation. In the current embodiments, security cards 40 or 140 maintain a copy of the table or equivalent data shown in FIG. 2 to facilitate navigation and may include table 100, 104, or both or their equivalent, but other variants are also possible.

Figure 5:
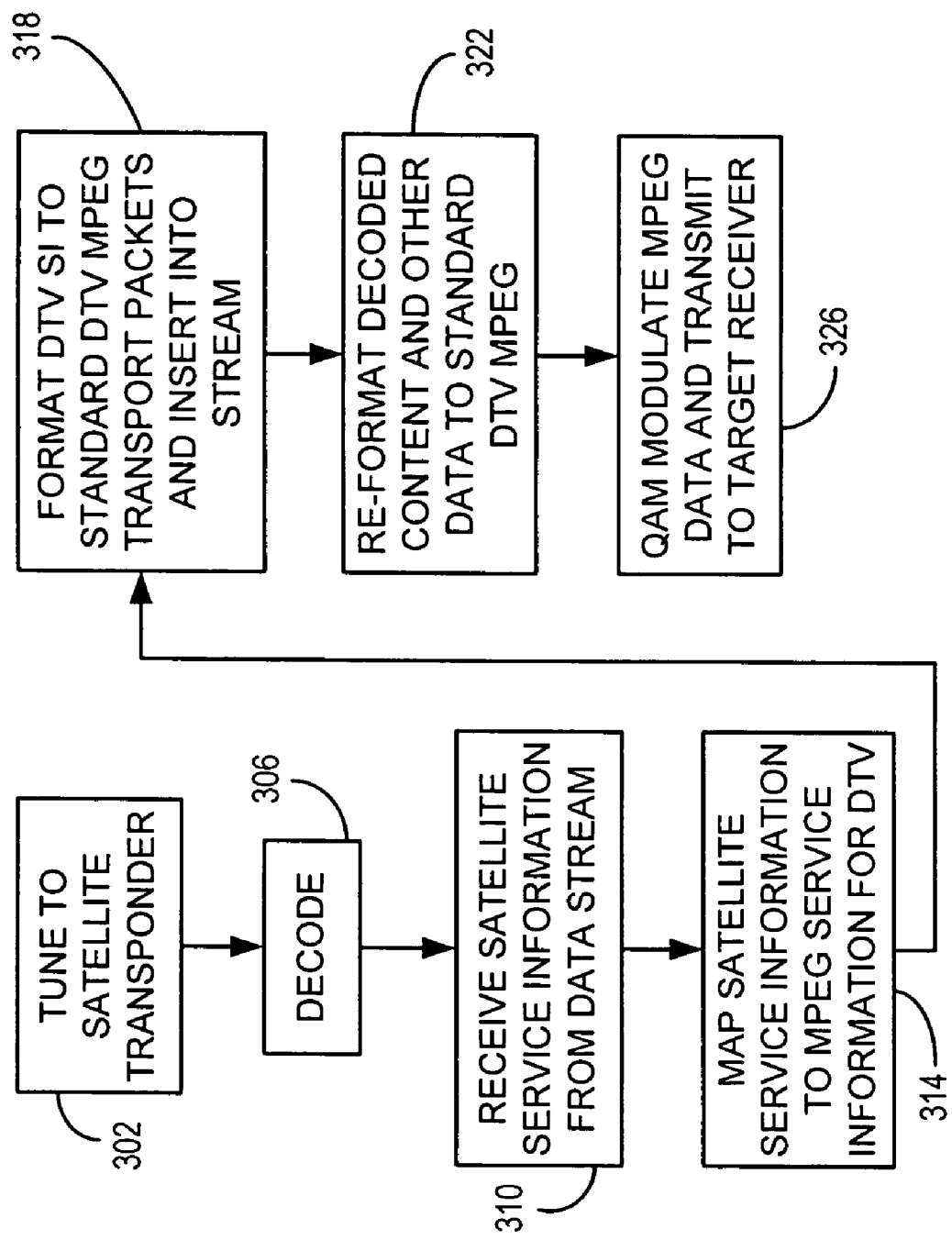
FIG. 5 illustrates an exemplary process carried out at RF converter 20 consistent with certain embodiments of the present invention.

FIG. 5 illustrates an exemplary process carried out at RF converter 20 in a manner consistent with certain embodiments of the present invention. In this flow chart, the RF converter 20 tunes to a particular satellite transponder using front end 44 at 302. At 306, the demodulated output of the front end 44 is decoded into a digital data stream. At 310, the satellite system's service information is retrieved from the data stream and mapped to DTV MPEG service information at 314. The DTV SI is then reformatted, if necessary, into DTV standard MPEG format at 318. If necessary, the content and other data (e.g., EPG data) are re-formatted into standard DTV MPEG at 322. All of the MPEG data are then re-modulated as QAM and placed in an appropriate UHF or VHF television frequency band for transmission to a target digital television receiver.

Figure 6:
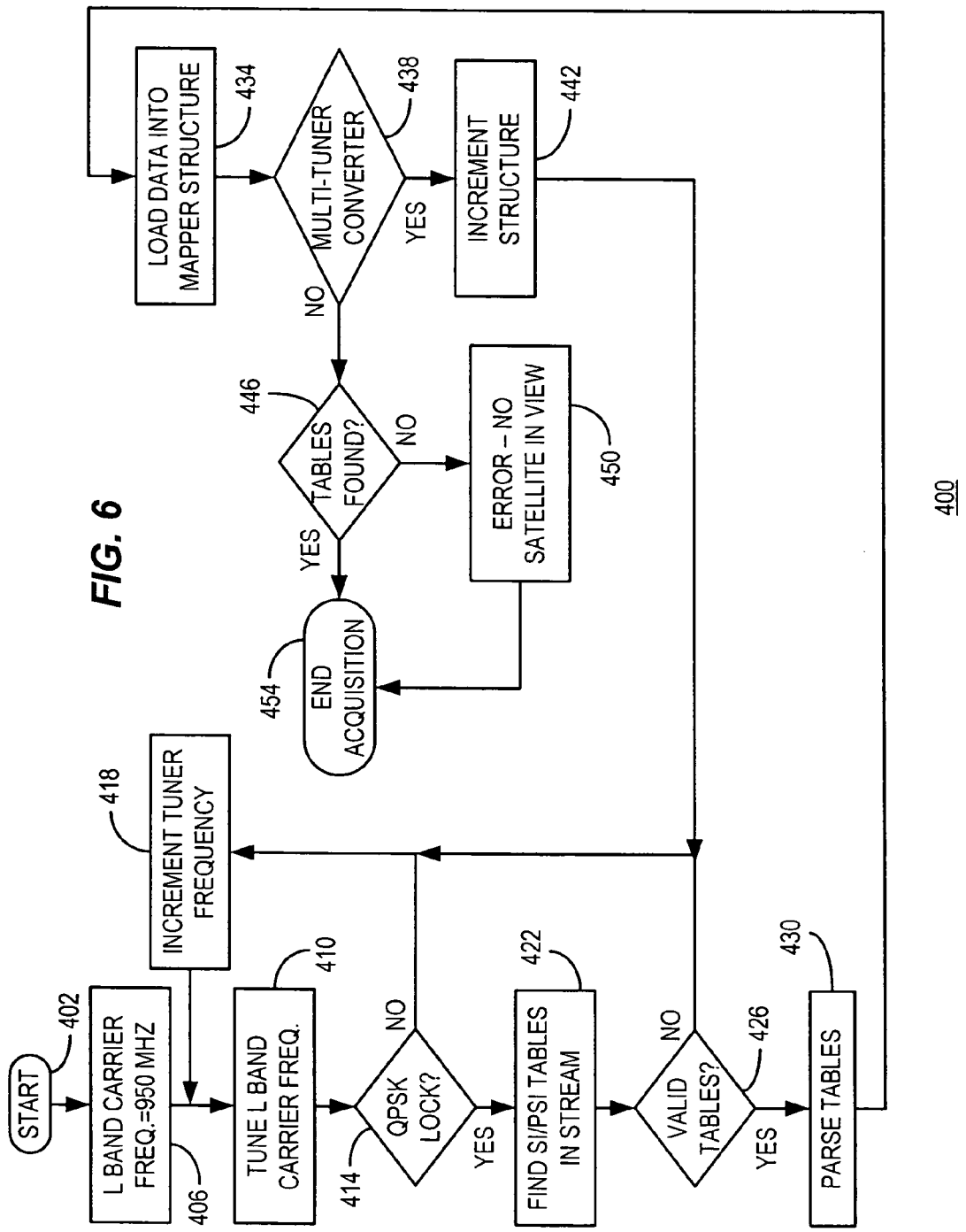
FIG. 6 is a flow chart of an exemplary data acquisition process consistent with certain embodiments of the present invention.

In operation, the RF converter 20 acquires satellite signals by carrying out an acquisition process, such as the exemplary process 400 of FIG. 6 starting at 402. At 406, the tuner is initialized by setting the L-band carrier frequency at 950 MHz. Control then passes to 410 where the tuner tunes to the L-band carrier frequency. At 414, if QPSK is not locked, control passes to 418 where the tuner frequency is incremented, LNB polarization changed or spectral inversion mode of demodulation selected. Control then returns to 410 in an attempt to tune the new L-band carrier frequency. If QPSK lock is achieved at 414, the receiver attempts to find SI/PSI (service information) tables within the locked data stream at 422. If valid tables are not found at 426, control again returns to 418 where the frequency is incremented. However, if valid tables are identified at 426, these tables are parsed at 430 and the data are loaded into the mapper structure at 434. In the event of a multiple tuner converter such as shown in FIG. 3, then the structure is incremented at 442 (i.e., the table structure, tables and underlying fields, is appended with additional, non-redundant entries found by scanning the other transponders, if any) and control returns to 418 where the frequency of the L-band receiver is incremented. In the event a multiple tuner converter is not in use, control passes to 446. If tables are found at 446, then the acquisition process ends at 454. Otherwise, an error has been encountered at 450 and a presumption that there is no satellite carrying the desired DBS service is in view can be made, after which the acquisition process ends at 454.

Referring now to FIG. 7, an exemplary channel mapping process consistent with certain embodiments of the present invention is depicted as process 500 starting at 504. At 508, the process calculates or otherwise determines a number of satellite transponders that are found or expected for a given satellite. At 512, the process calculates or otherwise determines the total number of satellite transport information rates for unique services or data. At 516, the process calculates the number of QAM streams that are required to carry the data. This can be calculated by taking the sum of the transport information rates and dividing that sum by ($38.81070 \times 10^6$ minus overhead bits). Then, at 520, for each of the n QAM streams, the average QAM rate should be equal to zero.

At 524, the next service indicated in the table is accessed. If, at 528, the average video rate is greater than 6 Megabits per second, then it can be determined that the video stream is a high definition stream. Otherwise, it is determined that the information rate is that of a standard definition video stream. At 532, the process calculates the QAM average rate plus the video rate, which is designated in the drawing to be $A_{rate}$. At 536, the process calculates the value of $38.81070 \times 10^6$ plus video overhead and this calculation is designated in the drawing as the $C_{rate}$. If at 540, the $A_{rate}$ is less than the $C_{rate}$, then at 544 it is known that the average QAM rate is equal to the average QAM rate plus the video rate. Thus, the service can be added as a QAM channel to the map. If the last QAM channel has not been processed at 548, then the process increments to the next QAM channel at 552, and control returns to 520. When the last QAM channel has been processed at 548, control passes to 560, and the process ends.

While certain embodiments herein were described in conjunction with specific circuitry that carries out the functions described, other embodiments are contemplated in which the circuit functions are carried out using equivalent software or firmware embodiments executed on one or more programmed processors. General purpose computers, microprocessor based computers, micro-controllers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware and/or dedicated processors.

Software and/or firmware embodiments may be implemented using a programmed processor executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies) and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A digital television (DTV) signal converter, comprising:
    a satellite band receiver that receives satellite television broadcast data from a satellite service and demodulates the satellite television broadcast data into a digital data stream;
    wherein the digital data stream contains television content, satellite television logical channel identification information and electronic program guide data, and wherein the television content, the satellite television logical channel identification information and the electronic program guide data are associated with a set of satellite television logical channels provided on the satellite service;
    a channel mapper that maps the satellite television logical channel identification information in the digital data stream to DTV channel identification information;
    a packet reformatter that determines, based upon the mapping of the satellite television logical channel identification information to the DTV channel identification information, whether each satellite television logical channel will fit within one DTV transport stream;
    for each satellite television logical channel within the set of satellite television logical channels, if the satellite television logical channel will fit within one DTV transport stream, then the packet reformatter assigns the satellite television logical channel to a single DTV transport stream, and if the satellite television logical channel will not fit within one DTV transport stream, then the packet reformatter splits the satellite television logical channel among multiple DTV transport streams; and
    a remodulator that modulates the DTV channel identification information, the television content and the electronic program guide data for transmission as an output comprising the one or more DTV transport streams to the at least one digital television.

2. The signal converter according to claim 1, wherein the satellite television logical channel identification information comprises a satellite number, a transponder number and an MPEG service number for each logical channel provided by the satellite television service.

3. The signal converter according to claim 2, wherein the DTV channel identifying information comprises SCTE 65 compliant tables.

4. The signal converter according to claim 1, wherein the DTV channel identifying information comprises SCTE 65 compliant tables.

5. The signal converter according to claim 1, wherein the channel mapper further maps satellite entitlement data associated with the satellite television logical channels for a specified subscriber to DTV compatible entitlement data, and wherein the DTV compatible entitlement data are also remodulated for receipt by the at least one digital television.

6. The signal converter according to claim 1, further comprising, at the at least one digital television, a security card that identifies a specified satellite service subscriber and carries out conditional access functions for the satellite service.

7. The signal converter according to claim 1, wherein the satellite band receiver is modular.

8. The signal converter according to claim 7, wherein the signal converter is adapted to receive multiple satellite band receiver modules.

9. The signal converter according to claim 1, wherein the remodulator is modular.

10. The signal converter according to claim 9, wherein the signal converter is adapted to receive multiple satellite band receiver modules.

11. The signal converter according to claim 1, further comprising a back channel receiver that receives commands from a digital television receiver recipient of the output of the signal converter in order to select at least one of a transponder and a satellite, and a frequency band in response to the commands.

12. The signal converter according to claim 1, wherein the satellite band receiver comprises satellite band receivers that tune to multiple transponders, and wherein the remodulator comprises means for transmitting output signals over a plurality of frequency bands.

13. The signal converter according to claim 12, wherein the remodulator comprises at least one quadrature amplitude modulation (QAM) modulator or VSB modulator.

14. The signal converter according to claim 1, wherein the content as received from the satellite is encrypted using a conditional access encryption method, and wherein the encrypted content is passed to the output without decryption.

15. The signal converter according to claim 1, wherein the content as received from the satellite includes electronic program guide (EPG) data, and wherein the EPG data are passed to the output without modification.

16. The signal converter according to claim 1, wherein the channel mapper maps a satellite television logical channel identifier directly to a DTV channel identifier without modification.

17. The signal converter according to claim 1, wherein the channel mapper maps entitlements directly from the satellite television logical channel identifying information to the DTV channel identifying information without modification.

18. The signal converter according to claim 1, wherein the channel mapper determines that the satellite television logical channel will not fit within the one DTV transport stream and assigns the satellite television logical channel to a plurality of transport streams for transmission.

19. The signal converter according to claim 18, wherein a single transport stream is used by the channel mapper to carry fragments of a plurality of logical channels.

20. The signal converter according to claim 1, further comprising a transcoder that transcodes the output of the packet reformatter into MPEG compliant video data.

21. A digital television (DTV) signal converter, comprising:
   a plurality of satellite band receivers that receive satellite television broadcast data from a satellite service and demodulate the satellite television broadcast data into a plurality of digital data streams;
   wherein the plurality of digital data streams each contain television content, satellite television logical channel identification information and electronic program guide data, and wherein the television content, the satellite television logical channel identification information and the electronic program guide data are associated with a set of satellite television logical channels provided on the satellite service;
   a channel mapper that maps the satellite television logical channel identification information in the data stream to DTV channel identification information;
   a packet reformatter that determines, based upon the mapping of the satellite television logical channel identification information to the DTV channel identification information, whether each satellite television logical channel will fit within one DTV transport stream
   for each satellite television logical channel within the set of satellite television logical channels, if the satellite television logical channel will fit within one DTV transport stream, then the packet reformatter assigns the satellite television logical channel to a single DTV transport stream, and if the satellite television logical channel will not fit within one DTV transport stream, then the packet reformatter splits the satellite television logical channel among multiple DTV transport streams; and
   a plurality of quadrature amplitude modulation (QAM) modulators that modulate the DTV channel identification information, the television content and the program guide data for transmission as an output comprising one or more QAM transport streams to the at least one digital television.

22. The signal converter according to claim 21, wherein the satellite television logical channel identification information comprises a satellite number, a transponder number and an MPEG service number for each logical channel provided by the satellite television service.

23. The signal converter according to claim 21, wherein the channel mapper further maps satellite entitlement data associated with the satellite television logical channels for a specified subscriber to DTV compatible entitlement data, and wherein the DTV compatible entitlement data are also QAM modulated for receipt by the DTV.

24. The signal converter according to claim 21, wherein the satellite band receivers are modular.

25. The signal converter according to claim 21, wherein the quadrature amplitude modulation modulators are modular.

26. The signal converter according to claim 21, wherein the content as received from the satellite is encrypted using a conditional access encryption method, and wherein the encrypted content is passed to the output without decryption.

27. The signal converter according to claim 21, wherein the content as received from the satellite includes electronic program guide (EPG) data, and wherein the EPG data are passed to the output without modification.

28. The signal converter according to claim 21, wherein the channel mapper maps a satellite television logical channel identifier directly to a DTV channel identifier without modification.

29. The signal converter according to claim 21, wherein the channel mapper maps entitlements directly from the satellite television logical channel identifying information to the DTV channel identifying information without modification.

30. The signal converter according to claim 21, wherein the channel mapper determines that the satellite television logical channel will not fit within one QAM transport stream and assigns the satellite television logical channel to a plurality of QAM transport streams for transmission.

31. The signal converter according to claim 30, wherein a single QAM transport stream is used by the channel mapper to carry fragments of a plurality of satellite television logical channels.

32. A digital television (DTV) signal converter, comprising:
   a plurality of modular satellite band receivers that receive satellite television broadcast data from a satellite service and demodulate the satellite television broadcast data into a plurality of digital data streams;

wherein the plurality of digital data streams each contain television content, satellite television logical channel identification information and electronic program guide data, and wherein the television content, the satellite television logical channel identification information and the electronic program guide data are associated with a set of satellite television logical channels provided on the satellite service;

wherein the satellite television logical channel identification information comprises a satellite number, a transponder number and an MPEG service number for each satellite television logical channel provided by the satellite television service;

a channel mapper that maps the satellite television logical channel identification information in a data stream to DTV channel identification information;

a packet reformatter that determines, based upon the mapping of the satellite television logical channel identification information to the DTV channel identification information, whether each satellite television logical channel will fit within one DTV transport stream;

for each satellite television logical channel within the set of satellite television logical channels, if the satellite television logical channel will fit within one DTV transport stream, then the packet reformatter assigns the satellite television logical channel to a single DTV transport stream, and if the satellite television logical channel will not fit within one DTV transport stream, then the packet reformatter splits the satellite television logical channel among multiple DTV transport streams; and a plurality of modular quadrature amplitude modulation (QAM) modulators that modulate the DTV channel identification information, the television content and the program guide data for transmission as an output comprising one or more QAM transport streams to the at least one digital television; and wherein the channel mapper further maps satellite entitlement data associated with the satellite television logical channels for a specified subscriber to DTV compatible entitlement data, and wherein the DTV compatible entitlement data are also QAM modulated for receipt by the at least one digital television.

33. The signal converter according to claim 32, wherein the content as received from the satellite is encrypted using a conditional access encryption method, and wherein the encrypted content is passed to the output without decryption.

34. The signal converter according to claim 32, wherein the content as received from the satellite includes electronic program guide (EPG) data, and wherein the EPG data are passed to the output without modification.

35. The signal converter according to claim 32, wherein the channel mapper maps a satellite television logical channel identifier directly to a DTV channel identifier without modification.

36. The signal converter according to claim 32, wherein the channel mapper maps entitlements directly from the satellite television logical channel identifying information to the DTV channel identifying information without modification.

37. The signal converter according to claim 32, wherein the channel mapper determines that the satellite television logical channel will not fit within one QAM transport stream and assigns the satellite television logical channel to a plurality of QAM transport streams for transmission.

38. The signal converter according to claim 37, wherein a single QAM transport stream is used by the data mapper to carry fragments of a plurality of satellite television logical channels.

* * * * *